United States Patent Office 2,769,831
Patented Nov. 6, 1956

2,769,831
PREPARATION OF UNSYMMETRICAL TRIALKYL-TETRATHIO-ORTHO-PHOSPHATES

Carleton B. Scott, Pomona, Calif., assignor to Union Oil Company of California, Los Angeles, Calif., a corporation of California No Drawing. Application May 2, 1955,
Serial No. 505,544
11 Claims. (Cl. 260—461)

This invention relates to the preparation of alkyl esters of tetrathio-ortho-phosphoric acid, and in particular concerns an improved method for preparing trialkyl-tetrathio-ortho-phosphates in which at least two of the alkyl groups are different.

In U. S. Patent No. 2,063,629, Salzberg and Werntz disclose reacting an alkyl mercaptan with phosphorus pentasulfide to obtain the corresponding trialkyl-tetrathio-ortho-phosphate. Tridodecyl-tetrathio-ortho-phosphate, $(C_{12}H_{25}S)_3PS$, is reported as being obtained by reacting 3 mols of dodecyl mercaptan with 1 mol of phosphorus pentasulfide. Such mode of operation, however, cannot satisfactorily be employed to prepare unsymmetrical trialkyl-tetrathio-ortho-phosphates, i. e. compounds of the general formula:

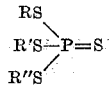

wherein R, R', and R'' each represents an alkyl group and at least two of said alkyl groups are different. If it is attempted to prepare such mixed esters by reacting two or three different alkyl mercaptans with phosphorus pentasulfide, the desired product is obtained in very low yield and in admixture with a variety of by-products from which it is difficult to separate.

I have now found that unsymmetrical trialkyl-tetrathio-ortho-phosphates of the above general formula can be prepared in good yield from alkyl-trithiometaphosphates. More particularly, I have found that alkyl-trithiometaphosphates react with alkyl mercaptans to form dialkyl-tetrathio-ortho-phosphates in accordance with the equation:

(1)     $RSPS_2 + R'SH \rightarrow (RS)(R'S)P(S)SH$ and that the latter compounds undergo reaction with olefines to form the desired mixed trialkyl-tetrathio-ortho-phosphates in accordance with the equation:

(2)     $(RS)(R'S)P(S)SH + \text{olefine} \rightarrow (RS)(R'S)(R''S)PS$ wherein R'' represents the alkyl group containing the same number of carbon atoms as the olefine employed. Both reactions occur smoothly at only moderately elevated temperatures to give the indicated product in good yield and in admixture with only minimum amounts of by-products. As will readily be apparent, by varying the identity of the alkyl mercaptan and olefine reactants the tri-ester product can be made to contain either two or three different alkyl groups.

The alkyl trithiometaphosphates which are employed as starting materials in the process of the invention may be prepared by reacting phosphorus pentasulfide with a molecular excess of an alkyl mercaptan. Alternatively, and more preferably, they may be prepared by reacting approximately equimolecular quantities of phosphorus pentasulfide and a trialkyl-tetrathio-ortho-phosphate. As is set forth in my copending application, Serial No. 508,821, filed May 16, 1955, the latter reaction takes place readily at moderately elevated temperatures, e. g. 90°–200° C., to form the corresponding trithiometaphosphates in good yield and easily isolated form.

The initial step of the present process, i. e., effecting reaction between an alkyl mercaptan and an alkyl-trithiometaphosphate to form a dialkyl-tetrathio-ortho-phosphate in accordance with Equation 1 above, is carried out simply by heating an approximately equimolecular mixture of the two reactants for from about 0.5 to about 5 hours at a reaction temperature between about 20° C. and about 200° C. and under sufficient pressure to maintain the reactants in the liquid phase. An inert reaction medium, such as benzene, toluene, diethyl ether, etc., may be employed if desired. The alkyl group of the alkyl mercaptan may be the same as, or different from, the alkyl group of the trithiometaphosphate reactant depending upon whether the final product is to contain two or three different alkyl groups. If desired the dialkyl-tetrathio-ortho-phosphate product may be isolated from the reaction mixture before proceeding to the second step of the process, but since the reaction goes substantially to completion without the formation of appreciable quantities of by-products the reaction mixture is usually employed directly in said second step.

The second step of the process, involving a reaction between the dialkyl-tetrathio-ortho-phosphate and an olefine in accordance with Equation 2 above, is carried out at temperatures between about 50° C. and about 200° C. employing more or less equimolecular quantities of the two reactants. The pressure should be sufficient to maintain the two reactants in the liquid phase, and if desired an inert reaction medium, such as benzene, xylene, etc., may be provided. The olefine reactant may contain the same or a different number of carbon atoms from that of the alkyl groups of the dialkyl-tetrathio-ortho-phosphate, depending upon whether the product is to contain two or three different alkyl groups. The reaction is relatively slow, usually requiring from about 4 to about 24 hours, and upon completion the desired product is isolated from the reaction mixture and purified by fractional distillation or crystallization.

Any alkyl-trithiometaphosphate, alkyl mercaptan, and olefine may be reacted step-wise as above explained to form a wide variety of mixed trialkyl-tetrathio-ortho-phosphates. The following tabulation of possible reactants and the resulting products is representative only, and is not to be construed as limiting the invention:

| Alkyltrithio-metaphosphate $RSPS_2$ | + | Alkyl Mercaptan R'SH | + | Olefine $C_nH_{2n}$ | → | Trialkyl-tetrathio-ortho-phosphate $(RS)(R'S)(R''S)PS$ |
|---|---|---|---|---|---|---|
| R=Methyl | | R'=Methyl | | Ethylene | | Dimethyl-ethyl-tetrathio-ortho-phosphate |
| Methyl | | n-Butyl | | Ethylene | | Methyl-ethyl-butyl-tetrathio-ortho-phosphate |
| Methyl | | Octyl | | Decene | | Methyl-octyl-decyl-tetrathio-ortho-phosphate |
| n-Propyl | | n-Butyl | | Propylene | | Dipropyl-butyl-tetrathio-ortho-phosphate |
| iso-Propyl | | Decyl | | Cetene | | iso-Propyl-decyl-cetyl-tetrathio-ortho-phosphate |
| n-Butyl | | Methyl | | Ethylene | | Methyl-ethyl-butyl-tetrathio-ortho-phosphate |
| n-Octyl | | n-Octyl | | Butylene | | Di-octyl-butyl-tetrathio-ortho-phosphate |
| n-Octyl | | Hexyl | | Dodecene | | Octyl-hexyl-dodecyl-tetrathio-ortho-phosphate |
| Decyl | | Methyl | | Octene | | Methyl-octyl-decyl-tetrathio-ortho-phosphate |
| Dodecyl | | Dodecyl | | Ethylene | | Di-dodecyl-ethyl-tetrathio-ortho-phosphate |
| Cetyl | | Methyl | | Propylene | | Methyl-propyl-cetyl-tetrathio-ortho-phosphate |
| Eicosyl | | Methyl | | Ethylene | | Methyl-ethyl-eicosyl-tetrathio-ortho-phosphate |

The following example will illustrate one way in which the principle of the invention has been applied, but is not to be construed as limiting the same.

Example

Methyl-trithiometaphosphate ($CH_3SPS_2$) was obtained as a yellow crystalline solid (M. P.=112° C.) by reacting phosphorus pentasulfide with a molecular excess of methyl mercaptan at 200°–240° F. under 25–100 p. s. i. g. in the presence of benzene as an inert reaction medium. Approximately equimolecular quantities of this material and n-propyl mercaptan weere dissolved in an equal volume of diethyl ether, and the solution was heated at reflux temperature under atmospheric pressure for about 2 hours. The reflux condenser was then removed and the ether was evaporated off, leaving crude methyl-propyl-tetrathio-ortho-phosphate as a viscous yellow liquid. The latter product was then heated with an equimolecular amount of n-octene at about 95° C. for 18 hours, after which the reaction product was fractionally distilled under vacuum to obtain the methyl-propyl-octyl-tetrathio-ortho-phosphate product as a viscous yellow oil distilling at about 120°–128° C. under 0.2 mm. pressure.

Other modes of applying the principle of my invention may be employed instead of those explained, change being made as regards the methods and materials employed, provided the step or steps stated by any of the following claims, or the equivalent of such stated step or steps, be employed.

I, therefore, particularly point out and distinctly claim as my invention:

1. The process for preparing a mixed trialkyl-tetrathio-ortho-phosphate containing at least two different alkyl groups which comprises heating a mixture of an alkyl-trithiometaphosphate and an alkyl mercaptan at a reaction temperature to form a dialkyl-tetrathio-ortho-phosphate, and thereafter heating a mixture of said dialkyl-tetrathio-ortho-phosphate and an olefine at a reaction temperature to form said mixed trialkyl-tetrathio-ortho-phosphate, at least two of the alkyl groups of said alkyl-trithiometaphosphate and said alkyl mercaptan and the alkyl group corresponding to the said olefine being different.

2. The process of claim 1 wherein the first of said heating steps is carried out at a temperature between about 90° C. and about 200° C., the second of said heating steps is carried out at a temperature between about 50° C. and about 200° C., and both of said heating steps are carried out under sufficient pressure to maintain the reactants in the liquid phase.

3. The process which comprises heating a mixture of an alkyl-trithio-metaphosphate of the general formula $RSPS_2$, wherein R represents an alkyl group, and an alkyl mercaptan of the general formula $R'SH$, wherein $R'$ represents an alkyl group different from R, at a reaction temperature to form a dialkyl-tetrathio-ortho-phosphate of the general formula $(RS)(R'S)P(S)SH$; and thereafter heating a mixture of said dialkyl-tetrathio-ortho-phosphate and an olefine at a reaction temperature to form a trialkyl-tetrathio-ortho-phosphate of the general formula $(RS)(R'S)(R''S)PS$, wherein $R''$ represents the alkyl group corresponding to said olefine.

4. The process of claim 3 wherein the first of said heating steps is carried out at a temperature between about 90° C. and about 200° C., the second of said heating steps is carried out at a temperature between about 50° C. and about 200° C., and both of said heating steps are carried out under sufficient pressure to maintain the reactants in the liquid phase.

5. The process which comprises heating a mixture of an alkyl-trithiometaphosphate of the general formula $RSPS_2$, wherein R represents an alkyl group, and an alkyl mercaptan of the general formula $RSH$ at a reaction temperature to form a dialkyl-tetrathio-ortho-phosphate of the general formula $(RS)_2P(S)SH$; and thereafter heating a mixture of said dialkyl-tetrathio-ortho-phosphate and an olefine at a reaction temperature to form a trialkyl-tetrathio-ortho-phosphate of the general formula $(RS)_2(R''S)PS$, wherein $R''$ represents the alkyl group corresponding to said olefine and is different from the alkyl group represented by R.

6. The process of claim 5 wherein the first of said heating steps is carried out at a temperature between about 90° C. and about 200° C., the second of said heating steps is carried out at a temperature between about 50° C. and about 200° C., and both of said heating steps are carried out under sufficient pressure to maintain the reactants in the liquid phase.

7. The process which comprises heating a mixture of an alkyl-trithiometaphosphate of the general formula $RSPS_2$, wherein R represents an alkyl group, and an alkyl mercaptan of the general formula $R'SH$, wherein $R'$ represents an alkyl group different from R, at a reaction temperature to form a dialkyl-tetrathio-orhto-phosphate of the general formula $(RS)(R'S)P(S)SH$; and thereafter heating a mixture of said dialkyl-tetrathio-ortho-phosphate and an olefine at a reaction temperature to form a trialkyl-tetrathio-ortho-phosphate of the general formula $(RS)(R'S)(R''S)PS$, wherein $R''$ represents the alkyl group corresponding to said olefine and is different from R and $R'$.

8. The process of claim 7 wherein the first of said heating steps is carried out at a temperature between about 90° C. and about 200° C., the second of said heating steps is carried out at a temperature between about 50° C. and about 200° C., and both of said heating steps are carried out under sufficient pressure to maintain the reactants in the liquid phase.

9. The process which comprises heating methyl-trithiometaphosphate with an alkyl mercaptan of the general formula $R'SH$, wherein $R'$ represents an alkyl group, at a reaction temperature to form a methyl-alkyl-tetrathio-ortho phosphate of the general formula $$(CH_3S)(R'S)P(S)SH$$

and thereafter heating a mixture of said methyl-alkyl-tetrathio-ortho-phosphate and an olefine at a reaction temperature to form a trialkyl-tetrathio-ortho-phosphate of the general formula $(CH_3S)(R'S)(R''S)PS$, wherein $R''$ represents the alkyl group corresponding to said olefine.

10. The process of claim 9 wherein the first of said heating steps is carried out at a temperature between 90° C. and about 200° C., the second of said heating steps is carried out at a temperature between about 50° C. and about 200° C., and both of said heating steps are carried out under sufficient pressure to maintain the reactants in the liquid phase.

11. The process of claim 9 wherein the alkyl mercaptan is methyl mercaptan.

No references cited.